United States Patent
Ness et al.

(10) Patent No.: US 10,137,818 B1
(45) Date of Patent: Nov. 27, 2018

(54) THIRD-ROW CONVEYOR LOAD FLOOR

(71) Applicant: FORD GLOBAL TECHNOLOGIES, LLC, Dearborn, MI (US)

(72) Inventors: Kyle Ness, Royal Oak, MI (US); Pattrick Loew, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/603,078

(22) Filed: May 23, 2017

(51) Int. Cl.
  *B60N 2/36* (2006.01)
  *B60P 1/40* (2006.01)
  *B60N 2/02* (2006.01)

(52) U.S. Cl.
  CPC .............. *B60P 1/40* (2013.01); *B60N 2/0232* (2013.01); *B60N 2/36* (2013.01)

(58) Field of Classification Search
  CPC ............... B60P 1/003; B60P 1/38; B60N 2/36
  USPC .................................................. 414/462, 528
  See application file for complete search history.

(56) References Cited

U.S. PATENT DOCUMENTS

| | | | | |
|---|---|---|---|---|
| 6,244,645 B1 * | 6/2001 | Baumert | .............. | B60N 2/3013 296/24.3 |
| 6,682,291 B2 * | 1/2004 | Schatzler | ................ | B60P 1/003 296/69 |
| 6,902,236 B2 * | 6/2005 | Tame | ..................... | B60N 2/206 297/331 |
| 7,066,543 B2 * | 6/2006 | Yu | ........................ | B60N 2/0232 297/362 |
| 8,100,478 B2 * | 1/2012 | Ellison | ................. | B60N 2/3013 297/341 |
| 9,108,540 B2 * | 8/2015 | Bonk | .................... | B60N 2/0232 |
| 9,656,578 B2 * | 5/2017 | Mitsuhashi | ............ | B60N 2/305 |
| 9,789,787 B2 * | 10/2017 | Wladimirow | ........ | B60N 2/0232 |
| 2008/0038101 A1 * | 2/2008 | Klatt | ........................ | B60P 1/38 414/345 |
| 2016/0355104 A1 * | 12/2016 | Kim | ..................... | B60N 2/0232 |

FOREIGN PATENT DOCUMENTS

| | | |
|---|---|---|
| DE | 10254250 A1 | 6/2004 |
| DE | 102005009384 A1 | 9/2006 |
| DE | 102011017485 A1 | 10/2012 |
| DE | 102012212501 A1 | 5/2014 |
| EP | 1026038 B1 | 9/2004 |

OTHER PUBLICATIONS

English Machine Translation of DE102005009384A1.
English Machine Translation of DE102011017485A1.
English Machine Translation of DE102012212501A1.
English Machine Translation of DE10254250A1.
English Machine Translation of EP1026038B1.

* cited by examiner

*Primary Examiner* — Kaitlin S Joerger
(74) *Attorney, Agent, or Firm* — Vichit Chea; King & Schickli PLLC

(57) ABSTRACT

A conveyer mechanism for a vehicle cargo area load floor includes a power seat assembly and a folding conveyer assembly carried by the power seat assembly and comprising a conveyer gearbox. A power seat motor is adapted to engage the conveyer gearbox when the power seat assembly is translated to a folded configuration. The power seat motor drives a conveyer drive gear when the power seat assembly is translated to the folded configuration, and drives a seat sector gear when the power seat assembly is translated to a deployed configuration.

20 Claims, 7 Drawing Sheets ific aspects of the disclosed cargo area load floor conveyor system, and together with the description serve to explain certain principles thereof. In the drawings:

FIG. 1 shows a vehicle cargo area including a cargo area load floor conveyor system according to the present disclosure;

THIRD-ROW CONVEYOR LOAD FLOOR

TECHNICAL FIELD

The present disclosure generally relates to load floors for vehicle cargo areas. More specifically, the present disclosure relates to a cargo area load floor comprising a conveyor system.

BACKGROUND

Vehicles having enclosed cargo areas, for example sport-utility vehicles, cross-over utility vehicles, and the like, often provide folding second- or third-row seats as a means for increasing the available load floor area for cargo items. By the simple expedient of folding the second- or third-row seat backs forward into a stowed configuration, cargo-carrying capacity of the vehicle may be increased.

However, especially for large sport-utility vehicles, placing items at a vehicle-forward portion of the cargo area when the second- or third-row seats are stowed may be difficult because such areas are difficult for a user to reach when standing at the rear of the vehicle/cargo area. To solve this and other problems, the present disclosure is directed to a cargo area load floor conveyor system. Advantageously, the cargo area load floor conveyor system includes a transitional gearbox adapted whereby a single motor drives both the translation of the second- or third-row seats between a stowed configuration and a deployed configuration, but also drives the operation of the load floor conveyer.

SUMMARY

In accordance with the purposes and benefits described herein, in one aspect of the present disclosure a conveyer mechanism for a vehicle cargo area load floor is provided, comprising a power seat assembly and a folding conveyer assembly carried by the power seat assembly and comprising a conveyer gearbox. A power seat motor is provided, which drives the conveyer gearbox when the power seat assembly is in a folded configuration. The conveyer mechanism may comprise a first conveyer member pivotably connected to a second conveyer member.

In embodiments, the first conveyer member is carried by an underside of a seat bottom. In other embodiments, the first conveyer member is carried by a vehicle-rear portion of a seat back and the second conveyer member is disposed on the vehicle cargo area load floor.

The power seat motor drives a seat folding drive gear which engages a seat sector gear when the power seat assembly is in a deployed configuration, and which engages a conveyer drive gear when the power seat assembly is in the folded configuration. In embodiments, the seat folding drive gear translates vehicle-inwardly to engage the conveyer drive gear on actuation of a conveyer actuator.

In embodiments, the power seat assembly is a second-row or a third-row seat assembly comprising two or more power seats. Two or more power seat motors and a folding conveyer assembly comprising two or more parallelly oriented folding conveyer belts may be provided.

In another aspect, a vehicle seat assembly is provided, comprising a power seat assembly having a motor adapted to translate the power seat assembly to a folded configuration. A folding conveyer assembly is at least partially carried by the power seat assembly. The folding conveyer assembly comprises at least one folding conveyer belt mechanism and a conveyer gearbox drivable by the motor when the power seat assembly is in the folded configuration. The folding conveyer assembly comprises a first conveyer member pivotably connected to a second conveyer member.

In embodiments, the first conveyer member is carried by an underside of a power seat assembly seat bottom. In other embodiments, the first conveyer member is carried by a vehicle-rear portion of a power seat assembly seat back and the second conveyer member is disposed on a vehicle load floor.

The motor drives a seat folding drive gear which engages a seat sector gear when the power seat assembly is in a deployed configuration, and which engages a folding conveyer assembly drive gear when the power seat assembly is in the folded configuration. In embodiments, the seat folding drive gear translates vehicle-inwardly to engage the folding conveyer assembly drive gear on actuation of a conveyer actuator.

In yet another aspect, a vehicle is provided, comprising a vehicle-rear load floor and a second- or third-row power seat assembly adjacent the load floor and including a pair of motors each adapted to translate a portion of the power seat assembly to a folded configuration. A folding conveyer assembly is at least partially carried by the power seat assembly. The folding conveyer assembly comprises a pair of substantially parallelly-oriented folding conveyer belt mechanisms each having a conveyer gearbox drivable by a one of the pair of motors when the power seat assembly is in the folded configuration. Each substantially parallelly oriented folding conveyer belt mechanism may comprise a first conveyer member pivotably connected to a second conveyer member.

In embodiments, the first conveyer member is carried by an underside of a seat bottom. In alternative embodiments, the first conveyer member is carried by a vehicle-rear portion of a seat back and the second conveyer member is disposed on the load floor.

Each of the pair of motors drives a seat folding drive gear which engages a seat sector gear when the second- or third-row power seat assembly is in a deployed configuration. The seat folding drive gear engages a folding conveyer assembly drive gear when the second- or third-row power seat assembly is in the folded configuration. In embodiments, the seat folding drive gear translates vehicle-inwardly to engage the folding conveyer assembly drive gear on actuation of a conveyer actuator.

In the following description, there are shown and described embodiments of the disclosed cargo area load floor conveyor system. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed cargo area load floor conveyor system, and together with the description serve to explain certain principles thereof. In the drawings.

Figure 1:
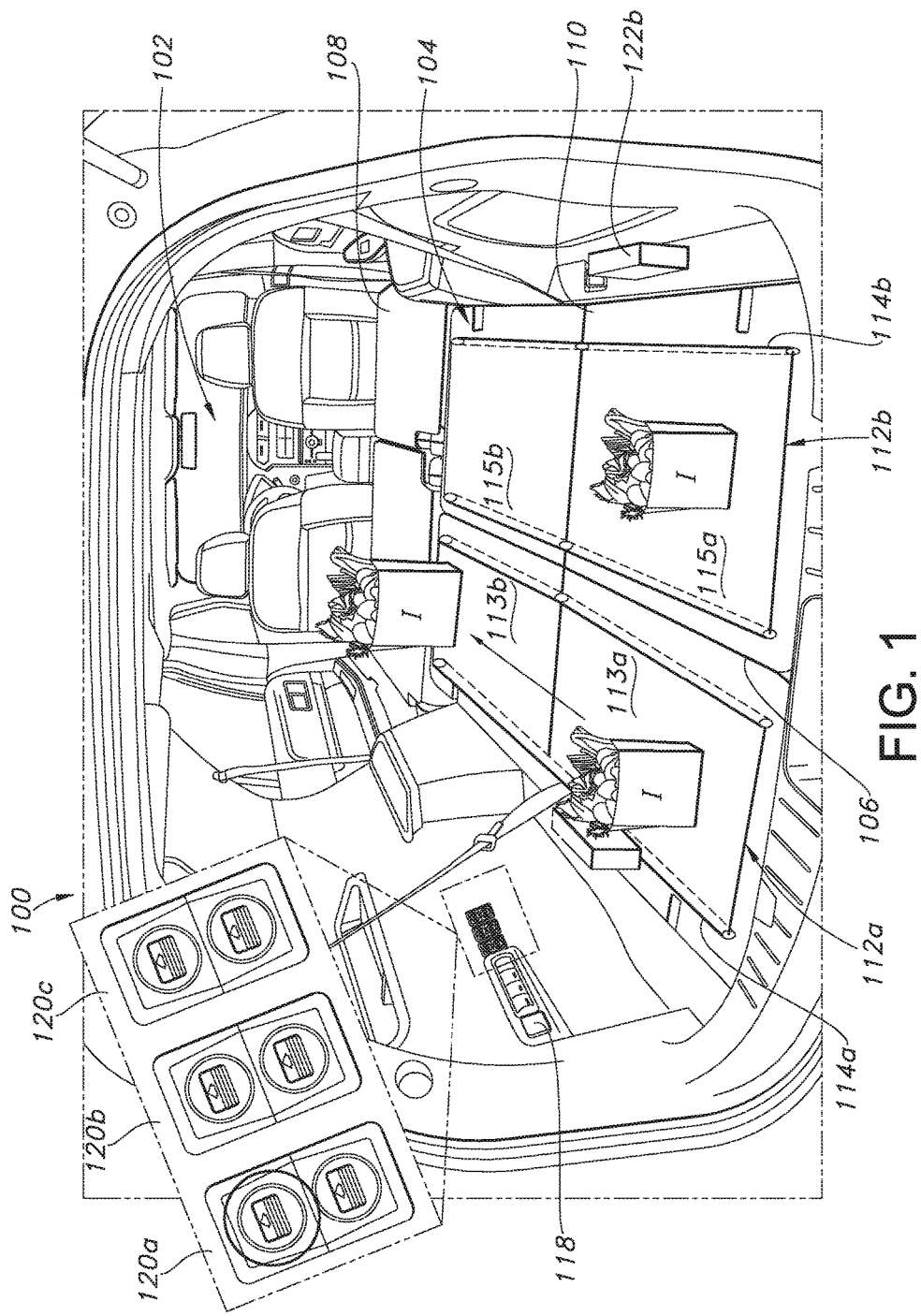
FIG. 1 shows a vehicle cargo area including a cargo area load floor conveyor system according to the present disclosure.

Reference will now be made in detail to embodiments of the disclosed cargo area load floor conveyor system, examples of which are illustrated in the accompanying drawing figures.

DETAILED DESCRIPTION

Preliminarily, the present disclosure describes a cargo area load floor conveyer system primarily associated with a vehicle 100 (see FIG. 1) having a rear enclosed cargo area 102 and a rear-most third-row folding seat assembly 104 (shown in a folded and stowed configuration) adjacent the cargo area, whereby by folding and stowing the folding seat assembly 104 a load carrying area of a load floor 106 of the cargo area may be increased. However, it will be appreciated that the described cargo area load floor conveyer system can equally be provided in any vehicle having a folding seat assembly adjoining a cargo area load floor, for example a second-row folding seat assembly 108. Accordingly, the disclosure will not be taken as limiting in this regard.

In vehicles such as are illustrated in FIG. 1, as described above placing items at a vehicle-forward portion of the cargo area 102 when the folding seat assembly 104 is folded and stowed may be difficult because such areas are difficult for a user to reach when standing at the rear of the vehicle/cargo area. At a high level, the present disclosure solves this problem by providing a cargo area load floor conveyor system 110 associated with a portion of the rear-most seat assembly 104. When the rear-most seat assembly 104 is folded and stowed, the cargo area load floor conveyer system 110 concomitantly is deployed and available for use. In the depicted embodiment, a cargo area load floor conveyer system 110 is shown including a pair of substantially parallelly oriented conveyers 112a, 112b. As shown, conveyer 112a comprises a first conveyer member 113a and a second conveyer member 113b, configured for folding according to a folding system for the folding seat assembly 104 as will be described. Conveyer 112b likewise comprises a first conveyer member 115a and a second conveyer member 115b configured for folding.

Figure 2:
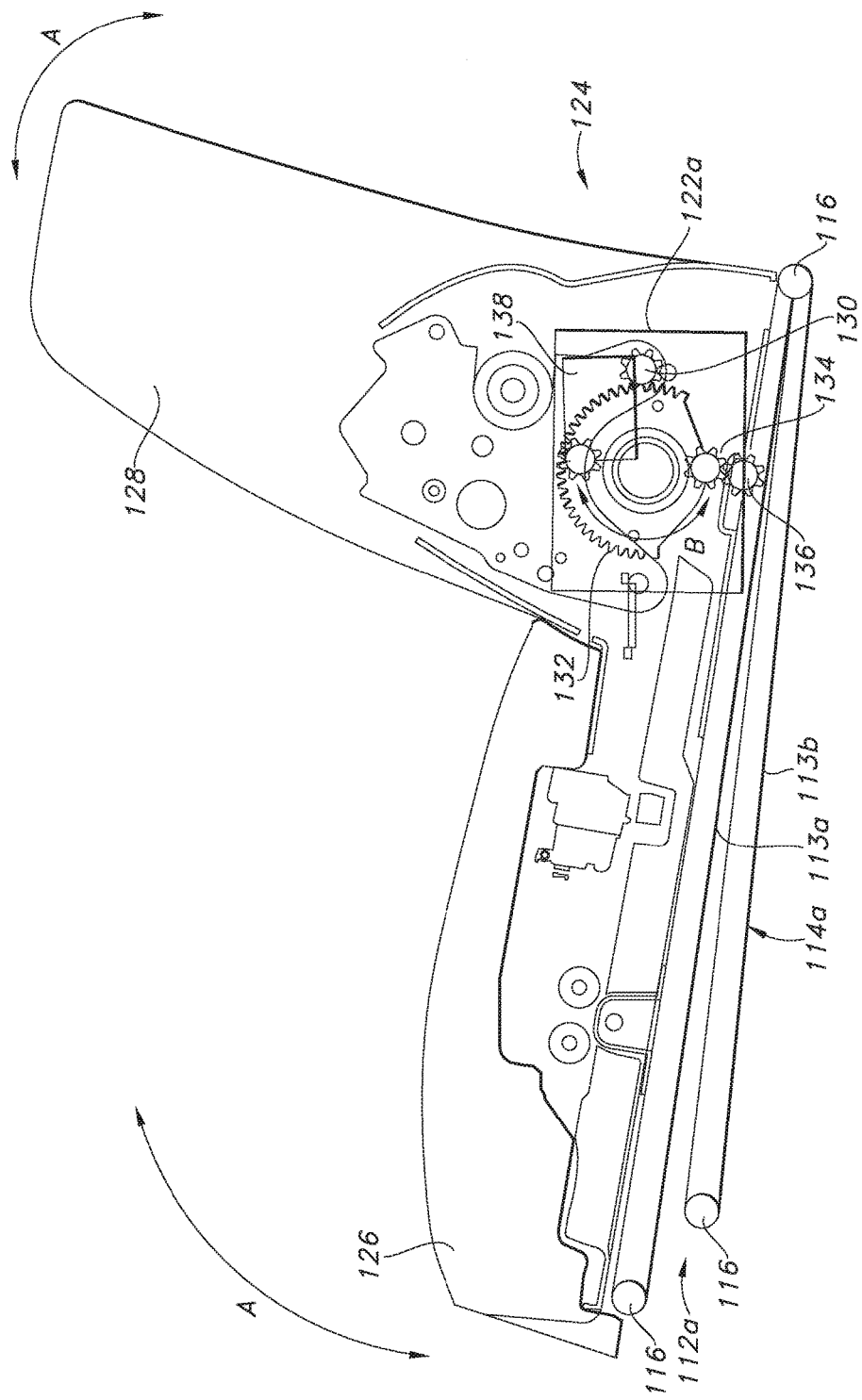
FIG. 2 shows a side view of a vehicle seat in a deployed configuration for use and including an integrated conveyer in a stowed configuration.

Each of the pair of substantially parallelly oriented conveyers 112a, 112b includes a translatable endless belt 114a, 114b traversing over rollers 116 (not visible in this view; see FIG. 2). The endless belts 114a, 114b may conveniently be fabricated of or covered with a material similar to that of a material covering the cargo area load floor 106, such as carpet material, vinyl, etc., to provide an aesthetically pleasing and uniform appearance. Of course, it will be appreciated that the conveyer system 110 may include more or fewer parallelly oriented conveyers 112/endless belts 114 as needed and in accordance with the dimensions of the cargo area 102.

A control panel 118 for the folding seat assembly 104 and conveyer system 110 may be provided on one or both sides of the cargo area 102, such as in a side wall 120 as shown in the drawing, including a plurality of actuators 120. In the depicted embodiment (see inset), separate actuators 120a, 120b, 120c for individually (actuators 120a, 120b) and collectively (actuator 120c) controlling vehicle-forward and vehicle-rearward translation of each conveyer 112a, 112b and of items I placed thereon are provided. Of course, alternative actuator configurations are possible and contemplated.

Each endless belt 114a, 114b could of course be driven by a dedicated conveyer motor. However, this arrangement requires providing one or more conveyer motors, and finding packaging space in the cargo area 102 to position the motor(s), preferably in a manner that is not obtrusive and does not occupy valuable cargo space. This adds cost, weight, and manufacturing complexity. To solve this problem, the cargo area load floor conveyer system 110 conveniently utilizes existing seat drive motors 122a, 122b which drive folding/unfolding of the rear-most seat assembly 104. Thus, the described cargo area load floor conveyer system 110 is provided with an already existing drive motor, and so no additional packaging space is required and no additional utilizable cargo area load floor 106 space is occupied.

Figure 3:
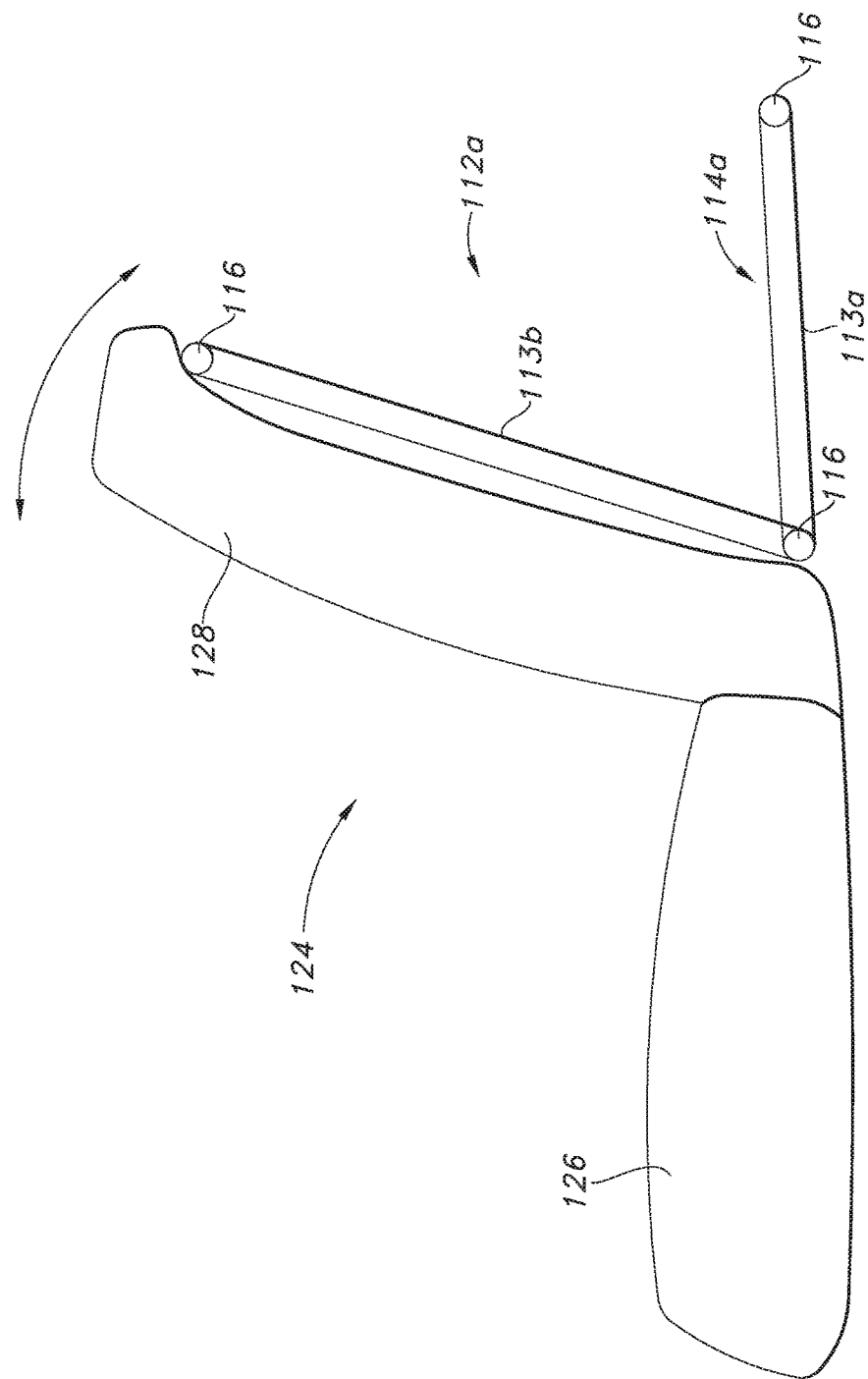
FIG. 3 shows an alternative embodiment of the vehicle seat including an integrated conveyer of FIG. 2.

In more detail, with reference to FIG. 2 conveyer 112a is shown associated with a seat 124 of rear-most seat assembly 104. In the depicted embodiment, the seat 124 is in an unfolded configuration and a portion of the conveyer 112a is integrated into a seat bottom 126 of the seat 124, whereby on folding (see arrows A) and stowing the seat 124 the conveyer 112a will concurrently be deployed/revealed for use. However, it will be appreciated that a portion of the conveyer 112a could equally be associated with a seat back 128 of the seat 124 whereby on folding (see arrow) and stowing the seat back 128 the conveyer 112a will concurrently be deployed/revealed for use (see FIG. 3).

Returning to FIG. 2, the seat drive motor 122a includes as is known a power rotation drive gear 130 and a seat fold spur gear 132. The motor also includes a drive shaft transition gear 134. In turn, the conveyer 112a includes a conveyer main drive gear 136 which, when engaged by the motor drive shaft transition gear 134, drives vehicle-forward and vehicle-rearward translation of the endless belt 114a. This is accomplished by providing a conveyer system gearbox 138 which allows altering a drive energy direction from seat 124-folding/unfolding to conveyer 112a driving when the seat 124 is placed in the folded and stowed configuration. As the seat 124 is folded to the stowed configuration, the drive shaft transition gear 134 is concurrently rotated (see arrow B) to align with the conveyer system gearbox 138.

Figure 4:
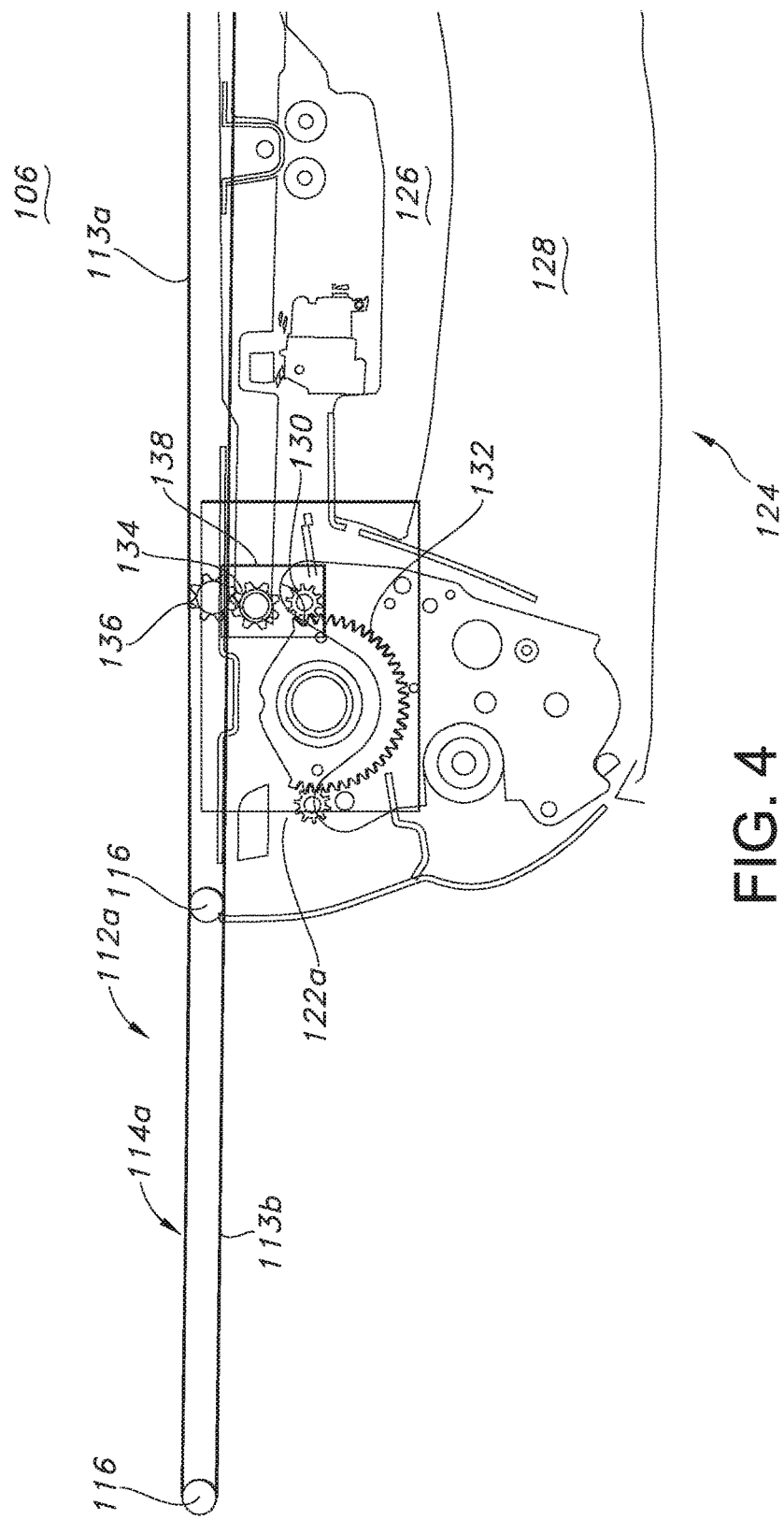
FIG. 4 shows a side view of the vehicle seat of FIG. 2, with the seat in a folded and stowed configuration and the integrated conveyer in a deployed configuration.

FIG. 4 illustrates the deployment of the conveyer 112a on folding and stowing the seat 124. As shown, the folding/stowing of the seat 124 has rotated the drive shaft transition gear 134 into alignment with the conveyer system gearbox 138, whereby the power rotation drive gear 130 can engage the conveyer main drive gear 136 on activation of a transmission.

Figure 5:
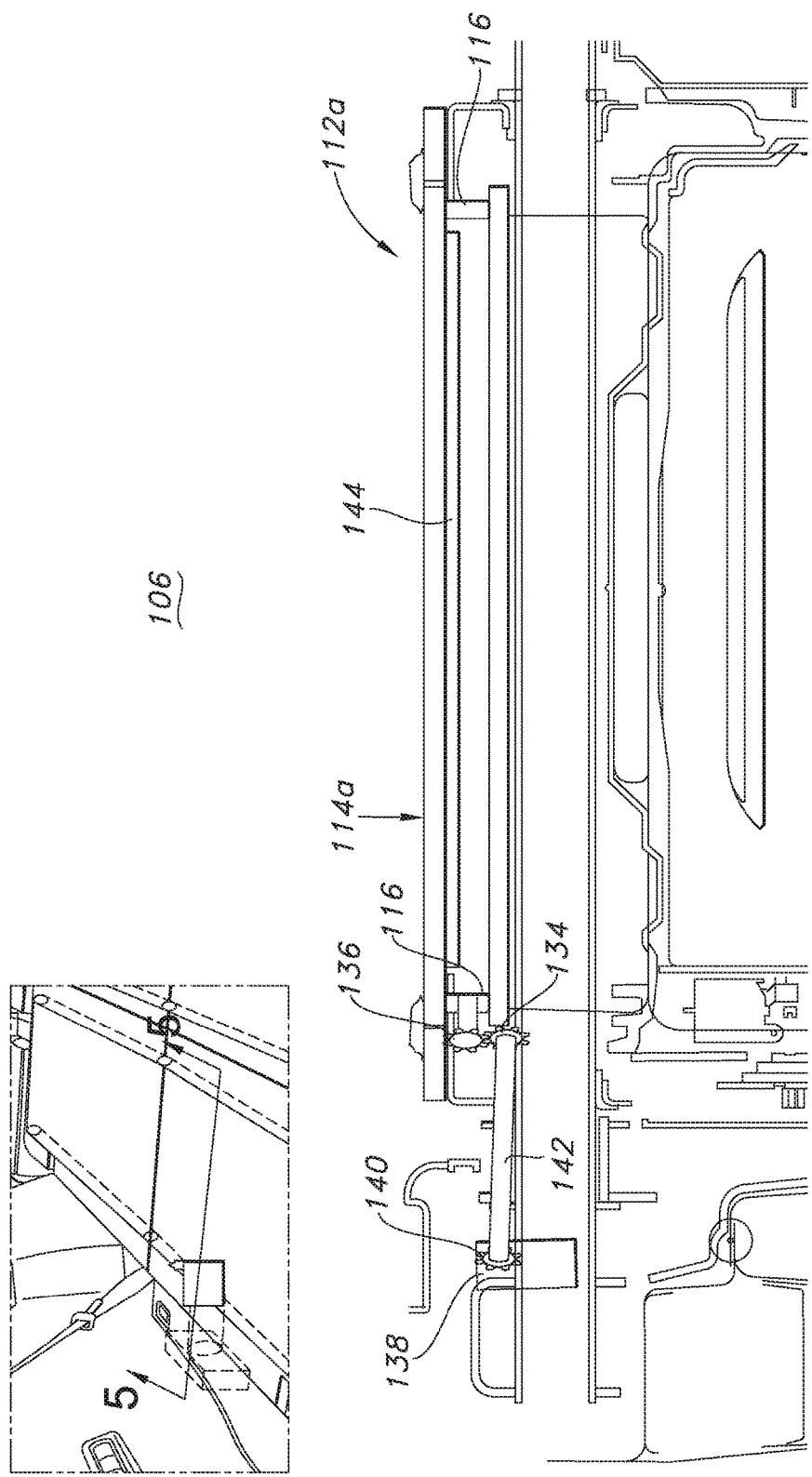
FIG. 5 shows a rear cross-sectional view of the cargo area load floor conveyer system according to the present disclosure.

This is shown in rear cross-section in FIG. 5. As shown in the drawing figure, when the seat 124 (not shown in this view) is in the folded and stowed configuration, gearbox 138 engages the power rotation drive gear 130 by a gearbox input drive gear 140 which drives a driveshaft 142. Driveshaft 142 in turn drives the drive shaft transition gear 134, which engages the conveyer main drive gear 136 to drive operation of the conveyer 112a over a conveyer support 144.

Figure 6A:
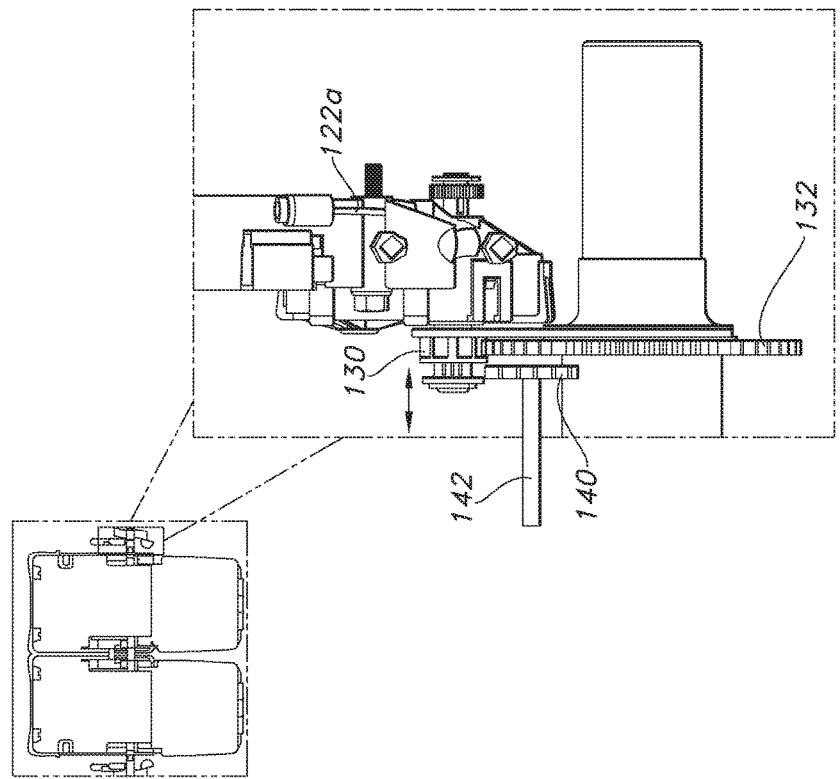
FIG. 6A shows a top view of a seat drive motor, engaging a seat fold spur gear 132.
Figure 6B:
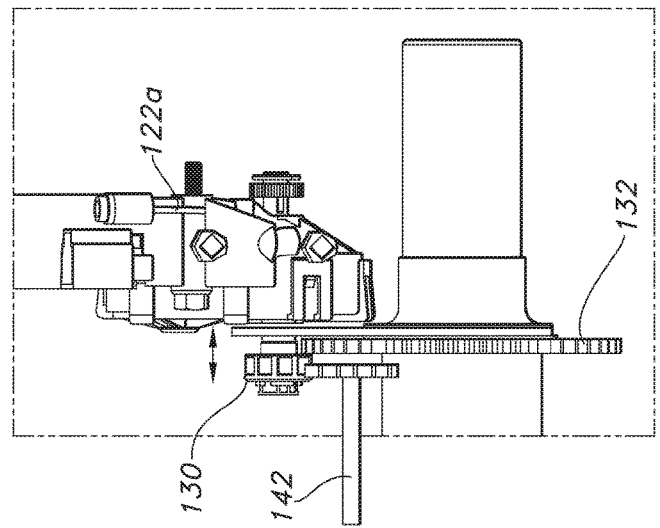
FIG. 6B shows a top view of the seat drive motor of FIG. 6A, engaging a conveyer gearbox input drive gear 140.

In one possible embodiment (see FIGS. 6A and 6B), the power rotation drive gear 130 may be adapted to engage the seat fold spur gear 132 when the seat 124 (not shown in this view) is in the unfolded, deployed configuration. Actuating an actuator 120 (not shown in this view, see FIG. 1) to fold the seat 124 will cause the seat to translate to the folded and stowed configuration shown in FIG. 4 whereby the conveyer 112a is deployed and ready for use. Next, actuating an actuator 120a, 120b, 120c (not shown in this view, see FIG. 1) will concurrently cause the power rotation drive gear 130 to laterally translate (see arrow) sufficiently to engage the gearbox input drive gear 140, whereby rotation of the power rotation drive gear will drive the conveyer 112a via conveyer main drive gear 136 as described above. Similar systems for providing such lateral translation of a gear are known in the art, for example for use in starter motors having translatable pinion gears which translate on application of an electrical current.

Of course, this is but one possible mode of operation comprising a gear transmission as described above. As another example (embodiment not shown), when the seat 124 is in the folded/stowed configuration the power rotation drive gear 130 may be adapted to disengage from the seat fold spur gear 132, and one or more of the gearbox 138, gearbox input drive gear 140, and driveshaft 142 may be adapted for lateral translation to engage the power rotation drive gear 130, such as by a hydraulic actuator. In another possible embodiment (not shown), an electromagnet coupled with a return spring could be adapted as a method of gear actuation. Supplying an electrical charge would cause the electromagnet to translate the power rotation drive gear 130 vehicle-inwardly (away from the energized electromagnet) to engage the conveyer main drive gear 136. On discontinuing the electrical charge to the electromagnet, the return spring would bias the power rotation drive gear 130 back into engagement with the seat fold spur gear 132.

Figure 7:
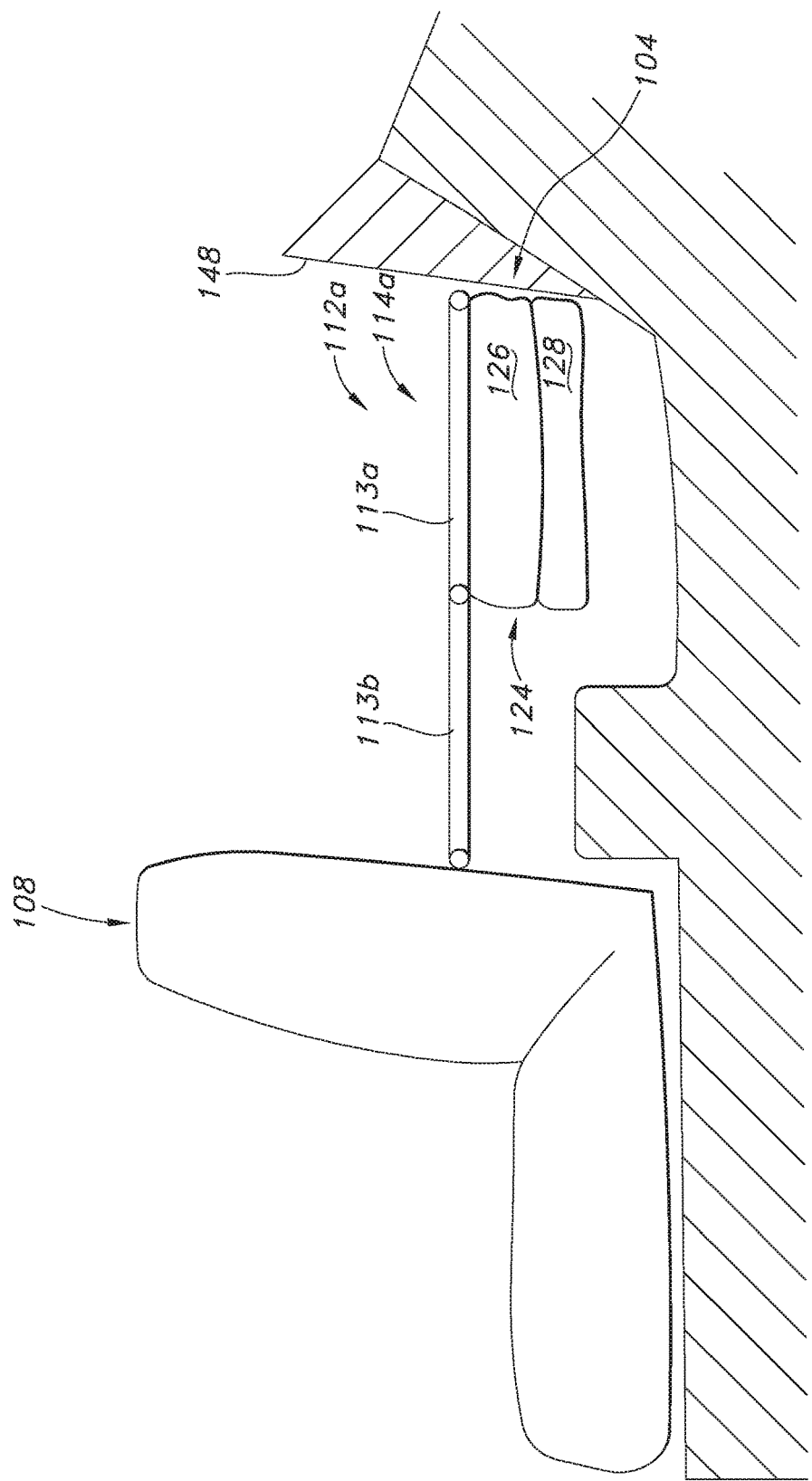
FIG. 7 shows a side view of a vehicle seat in a folded and stowed configuration, showing a foot well cover piece in an extended position.

Other features are contemplated for the cargo area load floor conveyor system 110 as described above. For example, FIG. 7 illustrates a rear-most third-row folding seat assembly 104 showing a seat 124 in the folded and stowed configuration. The illustrated conveyer 112a is in an unfolded/deployed configuration, ready for use. As shown, in this unfolded/deployed configuration, the second conveyer member 113b extends substantially to a rear of the next vehicle forward-most seat assembly, in the depicted embodiment being second-row folding seat assembly 108. By this feature, any open foot well space 146 is covered. As will be appreciated, this provides a substantially planar cargo area load floor including a conveyer system 110 extending substantially from a rear-most portion of second-row folding seat assembly 108 to vehicle-rearmost end 148 of the load floor 106/cargo area 102.

Accordingly, by the above-described mechanisms it will be appreciated that a compact and conveniently accessed cargo area load floor conveyer system 110 is provided. When a folding seat assembly is in an unfolded configuration for seat use, the conveyer system 110 is conveniently stowed. On unfolding the seat assembly, the conveyer system is conveniently deployed for use. In turn, for use the cargo area load floor conveyer system 110 does not require a dedicated drive motor, instead utilizing the existing seat drive motors 122a, 122b to drive the conveyers 112a, 112b by the mechanisms described above. This advantageously requires no additional impingement on available packaging space for such drive components, and likewise does not require use of valuable cargo area load floor 106 space.

Obvious modifications and variations are possible in light of the above teachings. All such modifications and variations are within the scope of the appended claims when interpreted in accordance with the breadth to which they are fairly, legally and equitably entitled.

What is claimed:

1. A conveyer mechanism for a vehicle cargo area load floor, comprising:
    a power seat assembly;
    a folding conveyer assembly carried by the power seat assembly and comprising a conveyer gearbox; and
    a power seat motor adapted to engage the conveyer gearbox when the power seat assembly is translated to a folded configuration.

2. The conveyer mechanism of claim 1, comprising a first conveyer member pivotably connected to a second conveyer member.

3. The conveyer mechanism of claim 2, wherein the first conveyer member is carried by an underside of a seat bottom.

4. The conveyer mechanism of claim 2, wherein the first conveyer member is carried by a vehicle-rear portion of a seat back and the second conveyer member is disposed on the vehicle cargo area load floor.

5. The conveyer mechanism of claim 1, wherein the power seat motor drives a conveyer drive gear when the power seat assembly is translated to the folded configuration, and drives a seat sector gear when the power seat assembly is translated to a deployed configuration.

6. The conveyer mechanism of claim 5, wherein a seat folding drive gear translates vehicle-inwardly to engage the conveyer drive gear on actuation of a conveyer actuator.

7. The conveyer mechanism of claim 1, wherein the power seat assembly is a second-row or a third-row seat assembly comprising two or more power seats.

8. The conveyer mechanism of claim 7, including two or more power seat motors and a folding conveyer assembly comprising two or more parallelly oriented folding conveyer belts.

9. A vehicle seat assembly, comprising:
    a power seat assembly;
    a motor adapted to translate the power seat assembly to a folded configuration; and
    a folding conveyer assembly at least partially carried by the power seat assembly, comprising at least one folding conveyer belt mechanism and a conveyer gearbox drivable by the motor when the power seat assembly is in the folded configuration.

10. The vehicle seat assembly of claim 9, wherein the folding conveyer assembly comprises a first conveyer member pivotably connected to a second conveyer member.

11. The vehicle seat assembly of claim 10, wherein the first conveyer member is carried by an underside of a power seat assembly seat bottom.

12. The vehicle seat assembly of claim 10, wherein the first conveyer member is carried by a vehicle-rear portion of a power seat assembly seat back and the second conveyer member is disposed on a vehicle load floor.

13. The vehicle seat assembly of claim 9, wherein the motor drives a seat folding drive gear which engages a seat sector gear when the power seat assembly is in a deployed configuration, and which engages a folding conveyer assembly drive gear when the power seat assembly is in the folded configuration.

14. The vehicle seat assembly of claim 13, wherein the seat folding drive gear translates vehicle-inwardly to engage the folding conveyer assembly drive gear on actuation of a conveyer actuator.

15. A vehicle, comprising:
a rear load floor;
a second- or third-row power seat assembly disposed adjacent to the rear load floor and including a pair of motors each adapted to translate a portion of the power seat assembly to a folded configuration; and
a folding conveyer assembly at least partially carried by the power seat assembly, comprising a pair of substantially parallelly-oriented folding conveyer belt mechanisms each having a conveyer gearbox drivable by a one of the pair of motors when the power seat assembly is in the folded configuration.

16. The vehicle of claim 15, wherein each substantially parallelly oriented folding conveyer belt mechanism comprises a first conveyer member pivotably connected to a second conveyer member.

17. The vehicle of claim 16, wherein the first conveyer member is carried by an underside of a seat bottom.

18. The vehicle of claim 16, wherein the first conveyer member is carried by a vehicle-rear portion of a seat back and the second conveyer member is disposed on the load floor.

19. The vehicle of claim 15, wherein each of the pair of motors drives a folding conveyer assembly drive gear when the second- or third-row power seat assembly is translated to the folded configuration, and drives a seat folding drive gear when the second- or third-row power seat assembly is translated to a deployed configuration.

20. The vehicle of claim 19, wherein a seat folding drive gear translates vehicle-inwardly to engage the folding conveyer assembly drive gear on actuation of a conveyer actuator.

* * * * *